United States Patent
Yamazaki et al.

(10) Patent No.: US 8,810,706 B2
(45) Date of Patent: *Aug. 19, 2014

(54) SOLID-STATE IMAGING APPARATUS AND IMAGING SYSTEM USING THE SOLID-STATE IMAGING APPARATUS

(71) Applicant: Canon Kabushiki Kaisha, Tokyo (JP)

(72) Inventors: Kazuo Yamazaki, Ebina (JP); Hiroki Hiyama, Zama (JP); Masaaki Iwane, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/670,175

(22) Filed: Nov. 6, 2012

(65) Prior Publication Data

US 2013/0063639 A1    Mar. 14, 2013

Related U.S. Application Data

(62) Division of application No. 12/628,271, filed on Dec. 1, 2009, now Pat. No. 8,325,260.

(30) Foreign Application Priority Data

Dec. 17, 2008  (JP) ................................. 2008-321292

(51) Int. Cl.
*H04N 3/14* (2006.01)
*H04N 5/335* (2011.01)

(52) U.S. Cl.
USPC ........................... 348/308; 348/241; 348/294

(58) Field of Classification Search
USPC .......................... 348/241, 295, 308, 302, 321
See application file for complete search history.

(56) References Cited

U.S. PATENT DOCUMENTS

| 6,115,066 | A | 9/2000 | Gowda et al. | 348/308 |
| 6,433,822 | B1 | 8/2002 | Clark et al. | 348/241 |
| 6,670,990 | B1 | 12/2003 | Kochi et al. | 348/310 |
| 6,960,751 | B2 | 11/2005 | Hiyama et al. | 250/208.1 |
| 7,009,163 | B2 * | 3/2006 | Katzir et al. | 250/208.1 |
| 7,110,030 | B1 | 9/2006 | Kochi et al. | 348/308 |
| 7,187,052 | B2 | 3/2007 | Okita et al. | 257/444 |
| 7,417,243 | B2 | 8/2008 | Katzir et al. | 348/295 |

(Continued)

FOREIGN PATENT DOCUMENTS

| DE | 102006008886 A1 | 2/2007 |
| EP | 1 742 369 A2 | 1/2007 |

(Continued)

*Primary Examiner* — Gevell Selby
(74) *Attorney, Agent, or Firm* — Fitzpatrick, Cella, Harper & Scinto

(57) ABSTRACT

It is an object of the present invention to provide a solid-state imaging apparatus that outputs digital signals at high speed. A solid-state imaging apparatus is provided that includes plural analog-to-digital converters that convert analog signals obtained by photoelectric conversion into digital signals, plural digital memories that store the digital signals converted by the analog-to-digital converters, plural block digital output lines that are provided to correspond to blocks of the plural digital memories and to which the digital signals stored in the plural digital memories included in the blocks are output, a common digital output line that outputs the digital signals output from the plural block digital output lines, buffer circuits that buffer the digital signals output from the block digital output lines, and block selecting units that can switch the block digital output lines electrically connected to the common digital output line.

5 Claims, 11 Drawing Sheets

(56) References Cited

U.S. PATENT DOCUMENTS

| | | |
|---|---|---|
| 7,423,790 B2 | 9/2008 | Kochi et al. .................... 358/513 |
| 7,429,764 B2 | 9/2008 | Koizumi et al. .............. 257/292 |
| 7,538,804 B2 | 5/2009 | Okita et al. ................... 348/241 |
| 7,557,847 B2 | 7/2009 | Okita et al. ................... 348/308 |
| 7,638,826 B2 | 12/2009 | Hiyama et al. ................ 257/291 |
| 2006/0044439 A1 | 3/2006 | Hiyama et al. ................ 348/308 |
| 2006/0186315 A1 | 8/2006 | Lee et al. .................... 250/208.1 |
| 2008/0024630 A1 | 1/2008 | Hiyama et al. ................ 348/241 |
| 2008/0029787 A1 | 2/2008 | Watanabe et al. ............. 257/233 |
| 2008/0055445 A1 | 3/2008 | Hatano et al. ................. 348/302 |
| 2008/0273093 A1 | 11/2008 | Okita et al. ................ 348/220.1 |
| 2008/0273107 A1 | 11/2008 | Taura ........................... 348/308 |
| 2008/0297636 A1 | 12/2008 | Mizuguchi et al. ........... 348/294 |
| 2009/0050993 A1 | 2/2009 | Yamazaki et al. ............ 257/432 |
| 2009/0219429 A1 | 9/2009 | Ogura et al. .................. 348/308 |
| 2009/0256936 A1 | 10/2009 | Sonoda et al. ................. 348/294 |
| 2009/0303364 A1 | 12/2009 | Shibata et al. ................ 348/302 |
| 2010/0002117 A1 | 1/2010 | Iwane et al. ................... 348/308 |
| 2010/0214462 A1 | 8/2010 | Itakura ......................... 348/302 |

FOREIGN PATENT DOCUMENTS

| | | |
|---|---|---|
| JP | 5-167932 A | 7/1993 |
| JP | 5-328039 A | 12/1993 |
| JP | 10-206553 A | 8/1998 |
| JP | 2005-333316 A | 12/2005 |
| JP | 2006-203929 A | 8/2006 |
| JP | 2006-238444 A | 9/2006 |
| JP | 2008-103992 A | 5/2008 |
| JP | 2008-172609 A | 7/2008 |
| JP | 2008-294913 A | 12/2008 |

\* cited by examiner

SOLID-STATE IMAGING APPARATUS AND IMAGING SYSTEM USING THE SOLID-STATE IMAGING APPARATUS

CROSS-REFERENCE TO RELATED APPLICATION

The present application is a division of application Ser. No. 12/628,271, filed Dec. 1, 2009, the entire disclosure of which is hereby incorporated herein by reference.

BACKGROUND OF THE INVENTION

1. Field of the Invention

The present invention relates to a solid-state imaging apparatus including analog-to-digital converters (AD converters) and an imaging system using the solid-state imaging apparatus.

2. Description of the Related Art

In recent years, there is proposed a configuration for providing an AD converter for each of columns and performing high-speed readout in a MOS type solid-state imaging apparatus.

FIG. 12 is a diagram illustrating the circuit configuration of a MOS type solid-state imaging apparatus 10 disclosed in Japanese Patent Application Laid-Open No. 2008-103992. Japanese Patent Application Laid-Open No. 2008-103992 discloses a solid-state imaging apparatus including AD converters 16 and 17 for each of columns of pixels 30 in order to realize an increase in speed. The solid-state imaging apparatus disclosed in Japanese Patent Application Laid-Open No. 2008-103992 includes plural data buses 19 and 20 that transmit AD-converted digital signals for the pixels independently from each other and reads out the digital signals from the plural data buses 19 and 20 in parallel.

Japanese Patent Application Laid-Open No. 2008-103992 also discloses a technique for dividing the pixels into two sections, a left section 11 and a right section 12, by a dividing line parallel to the columns and simultaneously reading out signals.

However, in the configuration disclosed in Japanese Patent Application Laid-Open No. 2008-103992, there is a significant problem in that, in the system for dividing the pixels into the left and right sections in the column direction of the pixels, signals cannot be read out in order in which the pixels are arrayed.

Usually, in an imaging apparatus, pixels in which photoelectric conversion elements are shielded from light called OB (optical black) pixels are arranged in respective rows and outputs of the OB pixels are used for correction and the like in a direction parallel to the rows. However, when the pixels are divided into the left and right sections, for example, if the OB pixels are arranged only on the left side of a pixel region, outputs of the OB pixels cannot be read out from an output terminal on the right side. Therefore, it is difficult to correct the outputs read out from the output terminal on the right side using the OB pixels.

Therefore, there is a demand for a technique for dividing a data bus for outputting digital signals into two or more sections and outputting outputs in order in which the pixels are arrayed.

SUMMARY OF THE INVENTION

It is an object of the present invention to provide a solid-state imaging apparatus mounted with an analog-to-digital converter that can output digital signals at high speed and can output the digital signals in order in which the pixels are arrayed and an imaging system using the solid-state imaging apparatus. A solid-state imaging apparatus according to the present invention comprises: a pixel region including a plurality of pixels arranged in a matrix, wherein the pixel performs photoelectric conversion to output an analog signal; a plurality of analog-to-digital converters for converting the analog signal into a digital signal arranged such that each of the analog-to-digital converters corresponds to each column of the pixels; a plurality of digital memories for holding the digital signal converted by the analog-to-digital converter; a plurality of block digital output lines arranged such that each one or more of the block digital output lines corresponds to each of blocks of the digital memories, wherein one of the blocks of the digital memories includes a plurality of the digital memories, and such that the digital signal held in a particular digital memory is output through the block digital output line corresponding to the block including the particular digital memory; a common digital output line for outputting the digital signal from the plurality of block digital output lines; a buffer circuit for buffering the digital signal from the common digital output line arranged between the block digital output line and the common digital output line; and a block selecting unit arranged between the block digital output lines and the common digital output line, the block selecting unit being capable of switching the digital output lines to be electrically connected to the common digital output line.

In another aspect of the present invention, an imaging system including the solid-state imaging apparatus; an optical system that forms a light image in the pixel region; and a signal processing unit that processes a signal output from the solid-state imaging apparatus is provided.

It is possible to output digital signals at high speed and output the digital signals in order in which the pixels are arrayed.

Further features of the present invention will become apparent from the following description of exemplary embodiments with reference to the attached drawings.

DESCRIPTION OF THE EMBODIMENTS

Exemplary embodiments of the present invention are described below with reference to the accompanying drawings.

First Embodiment

Figure 1:
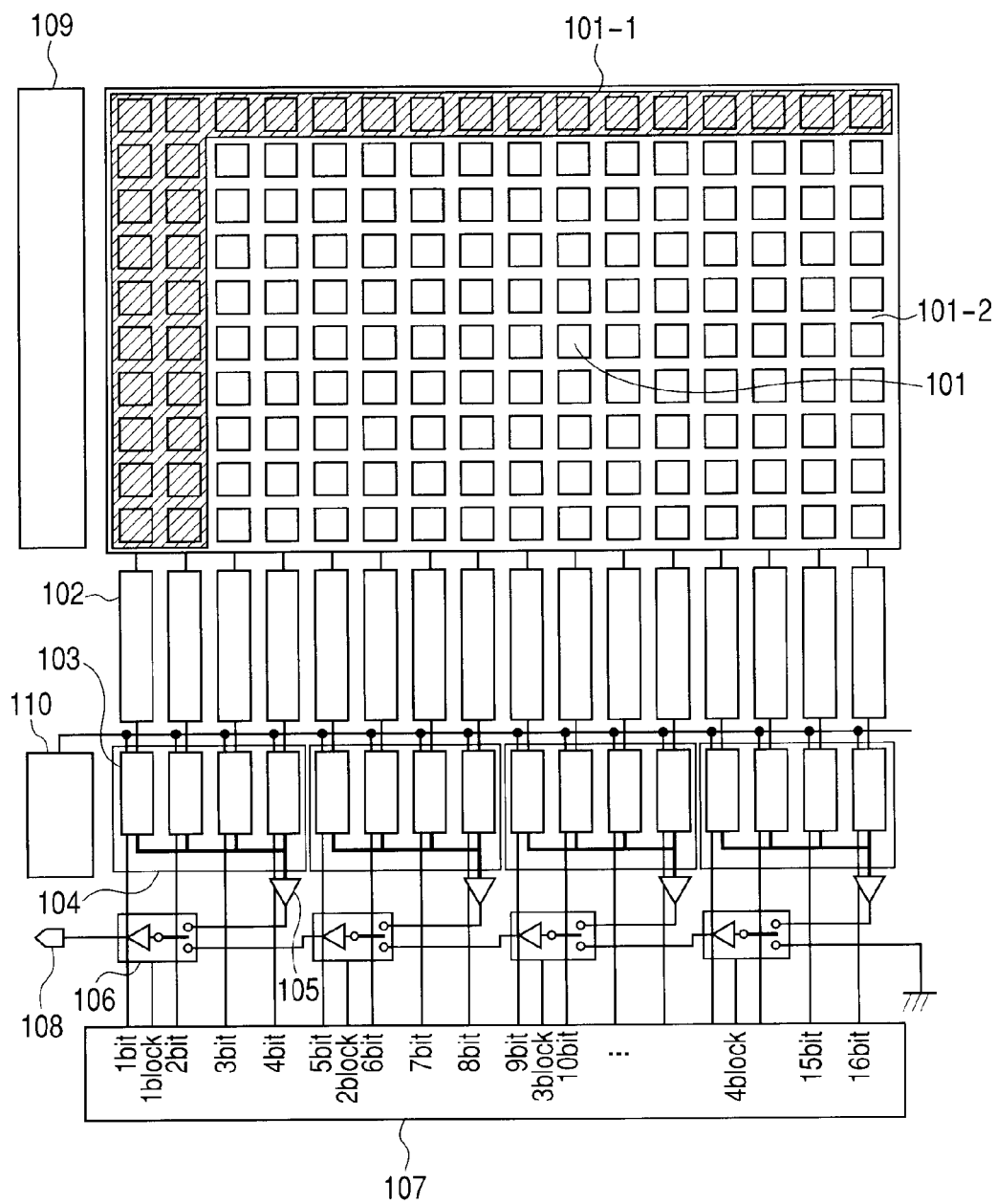
FIG. 1 is a block diagram illustrating a configuration example of a solid-state imaging apparatus according to a first embodiment of the present invention.

FIG. 1 is a diagram of a basic circuit configuration example of a MOS type solid-state imaging apparatus according to a first embodiment of the present invention. Basic circuits of this configuration example are formed on the same substrate of silicon and configured as one solid-state imaging apparatus. In this embodiment, for simplification, a pixel region is a pixel region 101 with pixels arranged in 10 rows×16 columns. One row at an upper end and two columns at a left end in this pixel region 101 are OB (optical black) pixels 101-1. Each of the OB pixels 101-1 has a photoelectric conversion element shielded from light. The other pixels in 9 rows×14 columns are effective pixels 101-2.

Reference numeral 102 denotes analog-to-digital converters (AD converters) provided to correspond to the columns of the pixel region 101. Reference numeral 103 denotes digital memories that temporarily store digital signals converted by the AD converters 102.

Reference numeral 104 denotes block digital output lines. In this embodiment, with the AD converters 102 and the digital memories 103 for four columns set as one block, the arrangement of four blocks corresponds to a readout circuit for sixteen columns (4 columns×4 blocks=16).

Reference numeral 108 denotes a common digital output line. Whereas only outputs from the digital memories 103 in the block are transmitted to the block digital output lines 104, digital outputs from the digital memories 103 in all the columns are transmitted to the common digital output line 108.

Reference numeral 105 denotes buffer circuits that buffer signals read out from the digital memories 103 to the block digital output lines 104. Reference numeral 106 denotes block selecting units that control a readout connection relation among the blocks. Usually, the block selecting units 106 include changeover switches and buffer circuits.

Reference numeral 107 denotes a horizontal scanning circuit that controls readout timing for the digital memories 103 in the respective columns. Reference numeral 109 denotes a vertical scanning circuit that controls readout timing for the pixels in the respective columns in the pixel region 101. As the circuit configuration of the horizontal scanning circuit 107 and the vertical scanning circuit 109, usually, a configuration of a shift register, a decoder or the like is used.

A readout method in this embodiment is described below in detail. Analog outputs from the pixels in the row in the pixel region 101 selected by the vertical scanning circuit 109 are analog-to-digital converted by the AD converters 102 corresponding to the respective columns. A result of the conversion is stored in the digital memories 103 corresponding to the respective columns as digital data.

Readout order of the digital data stored in the digital memories 103 is selected by the horizontal scanning circuit 107. When the digital memory 103 is selected, the digital data temporarily stored in the digital memory 103 is read out to the block digital output line 104.

The data read out to the block digital output line 104 is read out to the common digital output line 108 via the buffer circuit 105 and the block selecting unit 106.

In this embodiment, the number of columns in the pixel region 101 is sixteen and the four block digital output lines 104 are provided. Therefore, four digital memories 103 are connected in parallel for each of the block digital output lines 104. On the other hand, if block division is not employed, sixteen digital memories 103 would be connected in parallel. Therefore, the number of digital memories 103 connected in parallel and the length of a digital output line would be quadrupled. In this embodiment, since the digital output line is divided, all of the wiring resistance and the wiring capacity of the block digital output lines 104 and the total capacity of the digital memories 103 connected together are quartered. It goes without saying that the capacity and the resistance of readout wires are substantial hindrances in performing high-speed readout. Therefore, it is extremely effective for an increase in speed to arrange the block digital output lines 104 and reducing the resistance and the capacity in the block digital output lines 104 as in this embodiment.

Figure 2:
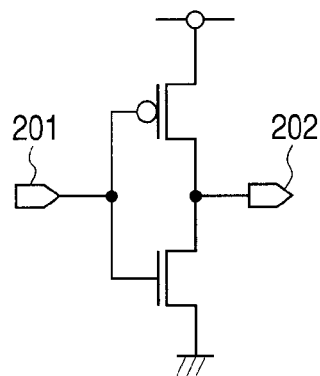
FIG. 2 is an equivalent circuit diagram of a CMOS inverter as an example of the circuit configuration of a buffer circuit 105 in FIG. 1.
Figure 3:
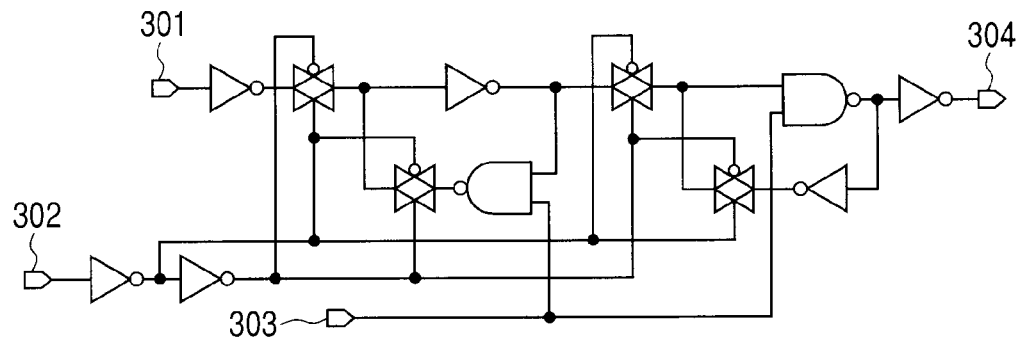
FIG. 3 is an equivalent circuit diagram of a flip-flop circuit as an example of the circuit configuration of the buffer circuit 105 in FIG. 1.
Figure 4:
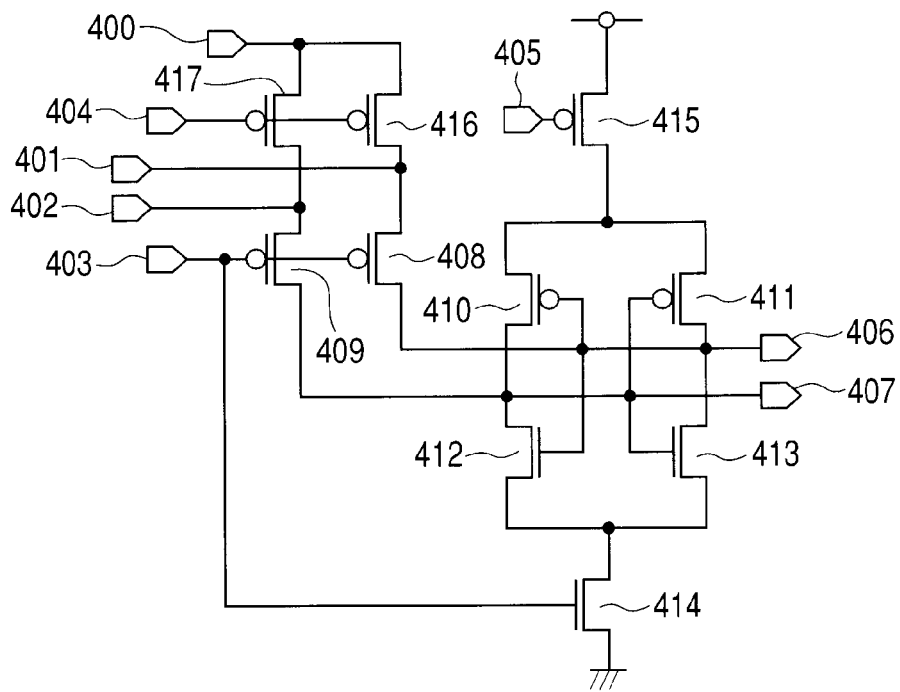
FIG. 4 is an equivalent circuit diagram of a sense amplifier circuit as an example of the circuit configuration of the buffer circuit 105 in FIG. 1.

FIGS. 2 to 4 are equivalent circuit diagrams illustrating examples of the buffer circuit 105 used in this embodiment. Since it is necessary to lay out the output circuits in the digital memory 103 at column pitches, it is usually difficult to increase a transistor size used in the output circuits. On the other hand, since the buffer circuits 105 only have to be laid out at pitches of the blocks, it is possible to relatively easily increase the transistor size.

In other words, since the digital output line is divided into the plural block digital output lines 104 to read out digital signals, load on the block digital output lines 104 driven by the output circuits of the digital memories 103 having small driving force can be reduced. It is possible to perform high-speed readout by driving the block digital output lines 104 to the common digital output line 108 with the buffer circuits 105 having large driving force.

A circuit in FIG. 2 is an example of the buffer circuit 105 and is a CMOS inverter circuit. Reference numeral 201 denotes an input terminal of the buffer circuit 105, and 202 denotes an output terminal of the buffer circuit 105. In FIG. 2, the circuit configuration of one stage of a CMOS inverter is illustrated as an example. However, a plurality of the CMOS inverters may be connected in series to increase driving force stepwise. A non-inverted buffer circuit can be configured by connecting CMOS inverters in even number stages in series. An inverted buffer circuit can be configured by connecting CMOS inverters in odd number stages in series. Any one of the configurations may be used.

A circuit in FIG. 3 is a synchronizing delaying circuit (a flip-flop circuit) as another configuration examples of the buffer circuit 105. It is possible to regenerate a waveform by connecting the block digital output line 104 to an input terminal 301 and synchronizing the output of the block digital output line 104 with a clock input to a clock terminal 302. Even if a signal of the block digital output line 104 is delayed, since the waveform is regenerated in exchange for delaying data output by one clock, it is possible to read out the signal at high speed in terms of a readout frequency, although a clock delay occurs in the output. Reference numeral 303 denotes a reset input terminal and 304 denotes an output terminal.

Figure 5:
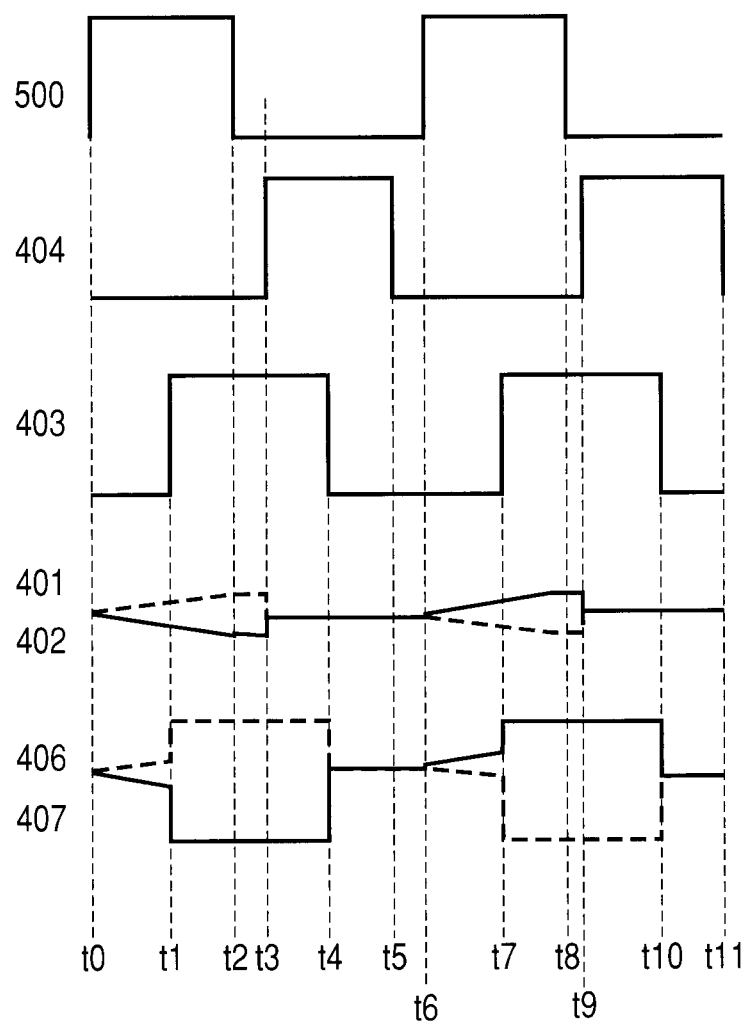
FIG. 5 is a timing chart illustrating the operation of the sense amplifier circuit in FIG. 4.

A circuit in FIG. 4 is a comparing circuit (a sense amplifier circuit) as another configuration examples of the buffer circuit 105. FIG. 5 is a timing chart of driving timing for the comparing circuit. When the buffer circuit 105 in FIG. 4 is applied in FIG. 1, the outputs from the digital memories 103 are non-inversion and inversion differential outputs. Therefore, the block digital output line 104 is also differential two lines.

Reference numeral 400 denotes digital output line reset voltage. Reference numerals 401 and 402 denote buffer circuit differential input terminals. Reference numerals 406 and 407 denote buffer circuit differential output terminals. Reference numeral 403 denotes a latch pulse input terminal. Reference numeral 404 denotes a digital output line reset pulse input terminal. Reference numeral 405 denotes a latch pulse input terminal (inverting). An inverted signal of a pulse given to the latch pulse input terminal 403 is given to the latch pulse input terminal (inverting) 405. Reference numerals 408 to 411 and 415 to 417 denote PMOS transistors. Reference numerals 412 to 414 denote NMOS transistors.

The two lines of the block digital output line 104 are connected to a non-inverted signal 401 and an inverted signal 402 in FIG. 4. An input differential signal is input to the buffer circuit 105. In FIG. 4, reference numeral 403 denotes a latch signal and 404 denotes a reset signal. Since reference numeral 405 denotes an inverted signal of the latch signal 403, detailed description of timing of the signal 405 is omitted.

Reference numerals 406 and 407 denote differential outputs of the sense amplifier. The output 406 is a non-inverted signal and the output 407 is an inverted signal. Reference numeral 500 in FIG. 5 denotes an enable pulse for enabling the outputs of the digital memories 103. An AND of the signal 500 and a column selected by the horizontal scanning circuit 107 is output timing of the digital memories 103.

Detailed operation is described according to a timing chart of FIG. 5. At time t0 to t2, the enable pulse 500 changes to a high level and the outputs of the digital memories 103 are enabled.

In this period, the nodes 401 and 402 change according to digital data temporarily stored in the digital memories 103. When the digital data temporarily stored in the digital memory 103 is represented as 1 (high level), the non-inverted signal 401 transitions to the high level and the inverted signal 402 transitions to a low level. However, as described above, since the driving force of the output circuits of the digital memories 103 is small, the signals 401 and 402 are delayed and an amount of change per unit time decreases.

The latch signal 403 is in a low level state until time t1. The PMOS transistors 408 and 409 are in an ON state and the NMOS transistor 414 and the PMOS transistor 415 are in an OFF state. Therefore, the nodes 406 and 407 are at the same level as the nodes 401 and 402 from time t0 to t1.

Subsequently, at time t1, the latch signal 403 changes to the high level and the NMOS transistor 414 and the PMOS transistor 415 change to the ON state. At this point, a latch circuit including the four MOS transistors 410, 411, 412, and 413 is enabled and a higher one of the nodes 406 and 407 changes to the high level and a lower one changes to the low level. A period of time t3 to t5 is a reset period. Readout from the digital memories 103 is not performed. In this period, the reset pulse 404 changes to the high level and initializes the nodes 401, 402, 406, and 407 to a reset level.

Operation at time t6 and subsequent time is repetition of the operation at time t0 to t5. However, the digital memories 103 output data of 0 (the low level). Therefore, a relation of level between the nodes 401 and 402 is reversed and results of the nodes 406 and 407 as output results are also reversed.

By using the sense amplifier illustrated in FIG. 4 as described above, it is possible to compare signal levels of the block digital output lines 401 and 402 with the latch circuit even at a stage of transition of the signal levels. Therefore, since it is unnecessary to transition the block digital output lines 401 and 402 to between a ground and a power supply, it is possible to read out signals at high speed and low power consumption. With this circuit configuration, logic is decided at the timing of the high level of the latch signal 403. Therefore, as in the flip-flop circuit in FIG. 3, there is also an effect of synchronizing a signal with a clock.

The data read out from the digital memories 103 and the block digital output line 104 by using the buffer circuit 105 in FIGS. 2 to 4 is output to the common digital output line 108 through the block selecting unit 106. The block selecting unit 106 is a circuit that switches a connection state among blocks when an output signal from the block digital output line 104 is output to the common digital output line 108.

The circuit configuration of the block selecting unit 106 generally includes a switch for switching selection and a flip-flop circuit, for example, the flip-flop circuit illustrated in FIG. 3. The block selecting unit 106 has a function of delaying a signal output by one clock and synchronizing a delay in a waveform besides the switching function.

Figure 6:
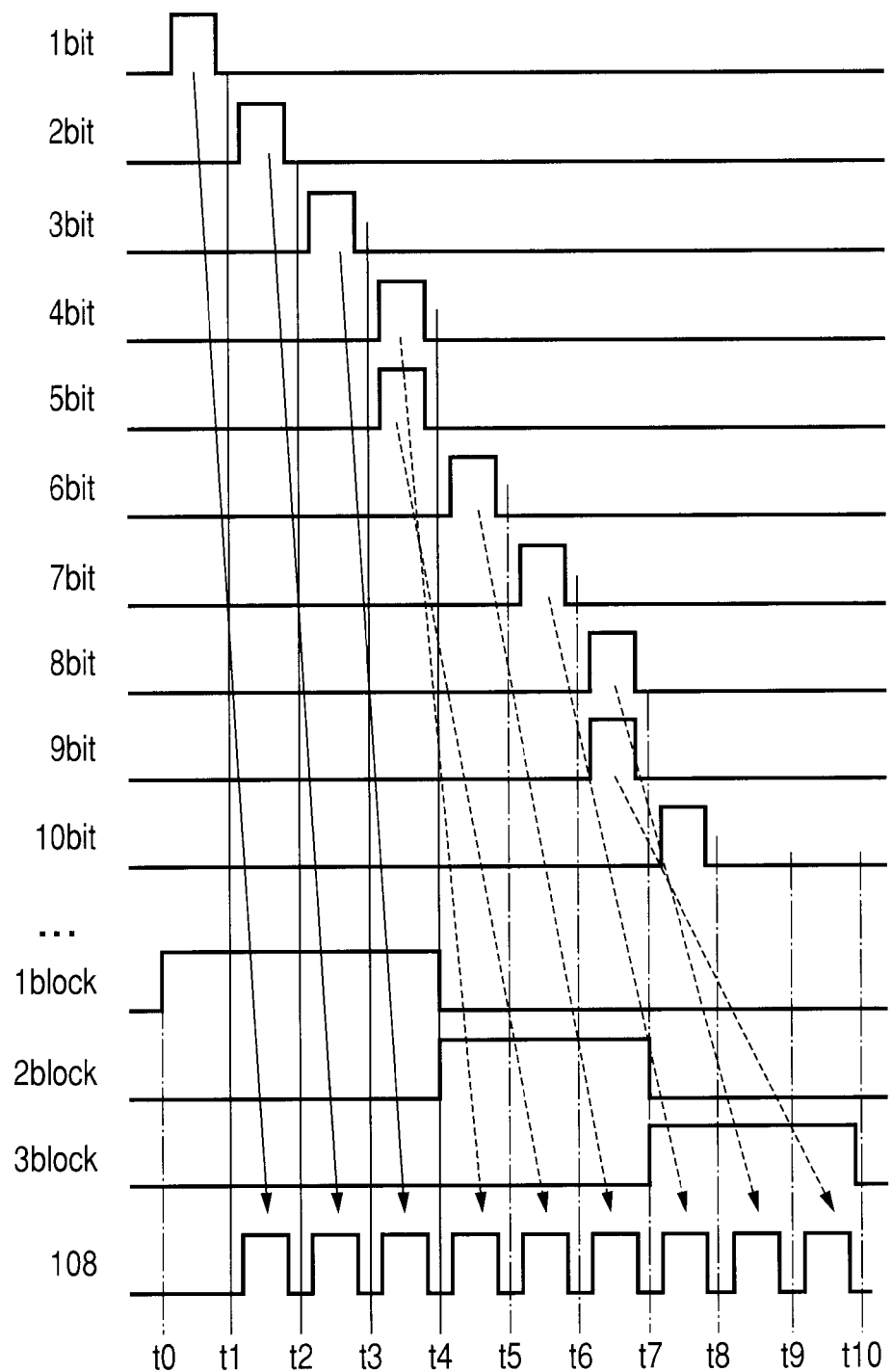
FIG. 6 is a timing chart illustrating the readout operation of the solid-state imaging apparatus according to the first embodiment of the present invention.

FIG. 6 is a timing chart illustrating a relation of readout between the block selecting unit 106 and the horizontal scanning circuit 107. Timing illustrated in FIG. 6 is described in detail below.

A first bit of the horizontal scanning circuit 107 changes to the high level at time t0 to t1 and a second bit changes to the high level at time t1 to t2. Therefore, readouts from the digital memories 103 in corresponding columns are enabled. The same holds true at time t2 to t3 and subsequent time. A first block of the block selecting unit 106 is enabled at time t0 to t4 and a second block is enabled at time t4 to t7. In other words, at time t0 to t4, the block selecting unit 106 operates such that output from the first buffer circuit 105 from the left in FIG. 1 is output to the common digital output line 108. At time t4 to t7, the block selecting unit 106 operates such that output from the second buffer circuit 105 from the left in FIG. 1 is output to the common digital output line 108. At time t7 and subsequent time, the block selecting unit 106 operates such that signals from adjacent blocks are sequentially output.

A readout result of the digital memories 103 for the first bit enabled at time t0 to t1 is output through the block selecting unit 106. Consequently, the read out result is output to the common digital output line 108 with a delay of one clock with respect to a clock supplied from a clock generator 110 as a timing generating circuit. Similarly, readout results of the digital memories 103 of second to fourth bits are output to the common digital output line 108 with a delay of one clock.

On the other hand, outputs of fifth to eighth bits are output to the common digital output line 108 through the switches of two block selecting units 106. As a result, output of a fifth bit selected at time t3 to t4 is output to the common digital output line 108 at time t5 to t6 with a delay of two clocks with respect to the clock supplied from the clock generator 110. Therefore, in this embodiment, a digital signal of a fourth bit and a digital signal of a fifth bit of the horizontal scanning circuit 107 are simultaneously changed to the high level with a difference in a delay in the respective blocks taken into account.

As described above, in this embodiment, periodicity of timing for enabling the bits of the horizontal scanning circuit 107 is changed at boundaries of the blocks. The timing for enabling the bits of the horizontal scanning circuit 107 is changed at the timing with a difference in the number of delays of clocks taken into account for each of the blocks.

Therefore, it is possible to read out signals to the common digital output line 108 in order of the columns without a break.

In this embodiment, a result of the AD conversion is temporarily stored in the digital memories 103 and digital data of the result is read out. On the other hand, in a format of analog output for not performing the AD conversion in an imaging apparatus, when block output lines are provided as in this embodiment and buffer circuits are arranged in the respective block output lines, an image is deteriorated because of fluctuation among the blocks. This is because, in the respective blocks, very small changes in characteristics of the block output lines, the buffer circuits, and selecting circuits lead to a step (offset) among the blocks when output as an image. This problem is almost negligible in the readout format of this embodiment for handling digital data. Therefore, in this embodiment for reading out the digital data temporarily stored in the digital memories 103 after being AD-converted, it is possible to read out signals at high speed while suppressing deterioration in an image quality.

It is particularly important in generating an image in an imaging apparatus to output signals in order in which the pixels are arrayed and without a break. This is because it is important to read out signals in order in which the pixels are arrayed in performing correction using OB pixels and performing signal processing other than the correction. For example, when signals are output in order different from order in which the pixels are arrayed or signals are output non-periodically, this is not preferable because signal processing is complicated. In this embodiment, it is possible to perform block division and read out data in respective columns in order in which the pixels are arrayed and without a break while reading out digital signals at high speed. Therefore, this embodiment is particularly effective in the technical field of solid-state imaging apparatuses.

In this embodiment, the common digital output line 108 is arranged on the first bit side. However, an arrangement place of the common digital output line 108 is not limited to this. Although it is necessary to change timing of the block selecting circuit 106 and the horizontal scanning circuit 107, the same effects can be obtained irrespective of the arrangement place of the common digital output line 108 by adjusting the driving timing.

In this embodiment, a set of the AD converter 102 and the digital memory 103 is arranged for each of the pixel columns. However, the effects in this embodiment can be sufficiently obtained even if, for example, one AD converter is arranged for plural pixel columns or two or more AD converters are arranged for one pixel column as long as a relation between AD conversion speed and readout speed is satisfied.

In this embodiment, the digital memories 103 only have to have a function of temporarily storing AD-converted digital data. For example, in FIG. 1, the clock generator 110 is provided. However, a counter circuit may be provided instead of the clock generator 110 and the digital memories 103 in the respective columns may latch (store) a counter output value of the counter circuit at timing of the digital memories 103. Alternatively, a clock generator that outputs a master clock may be provided instead of the clock generator 110 and the digital memories 103 may adopt a column counter format to store a count value for each of the columns.

Second Embodiment

Figure 7:
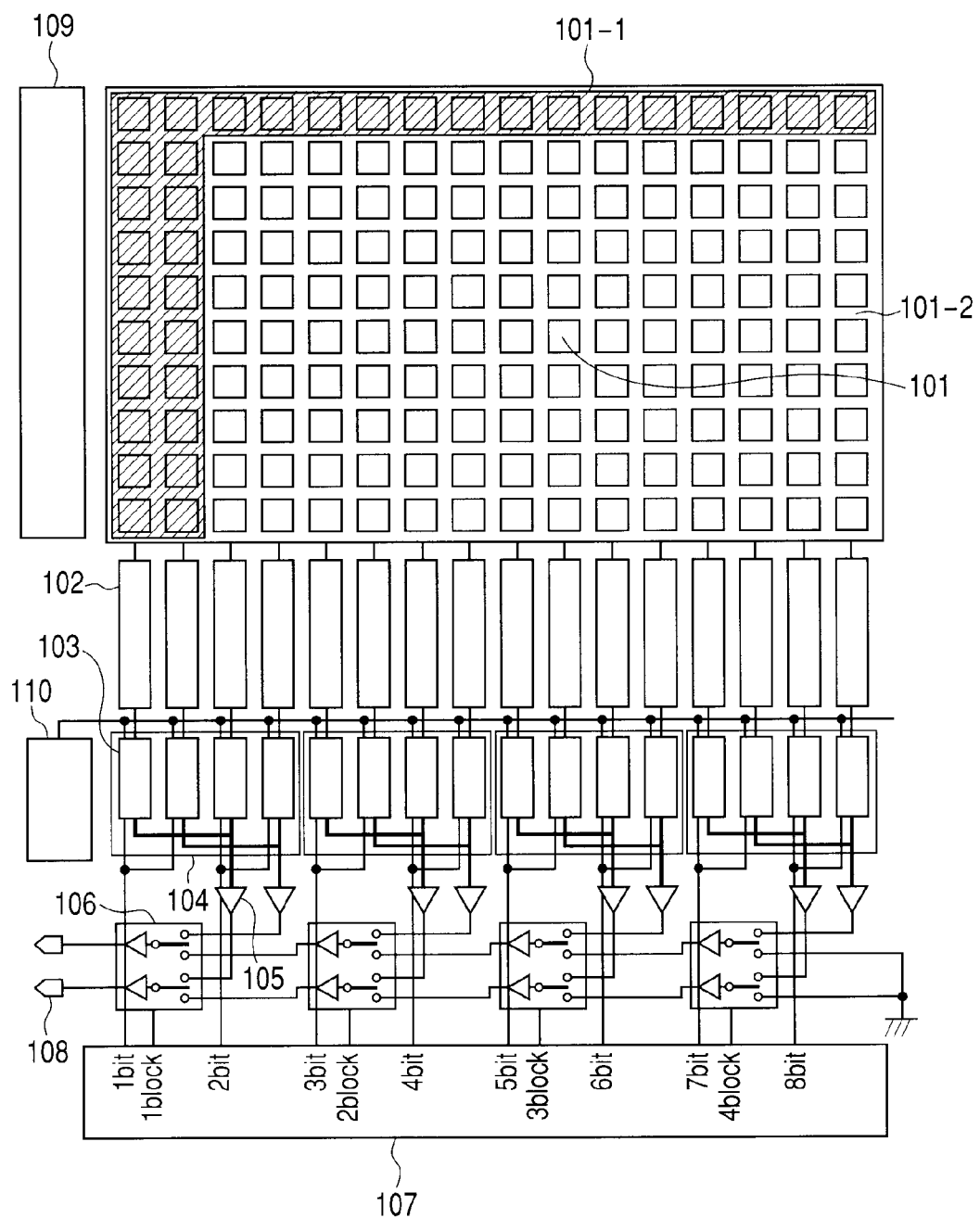
FIG. 7 is a block diagram illustrating a configuration example of a solid-state imaging apparatus according to a second embodiment of the present invention.
Figure 8:
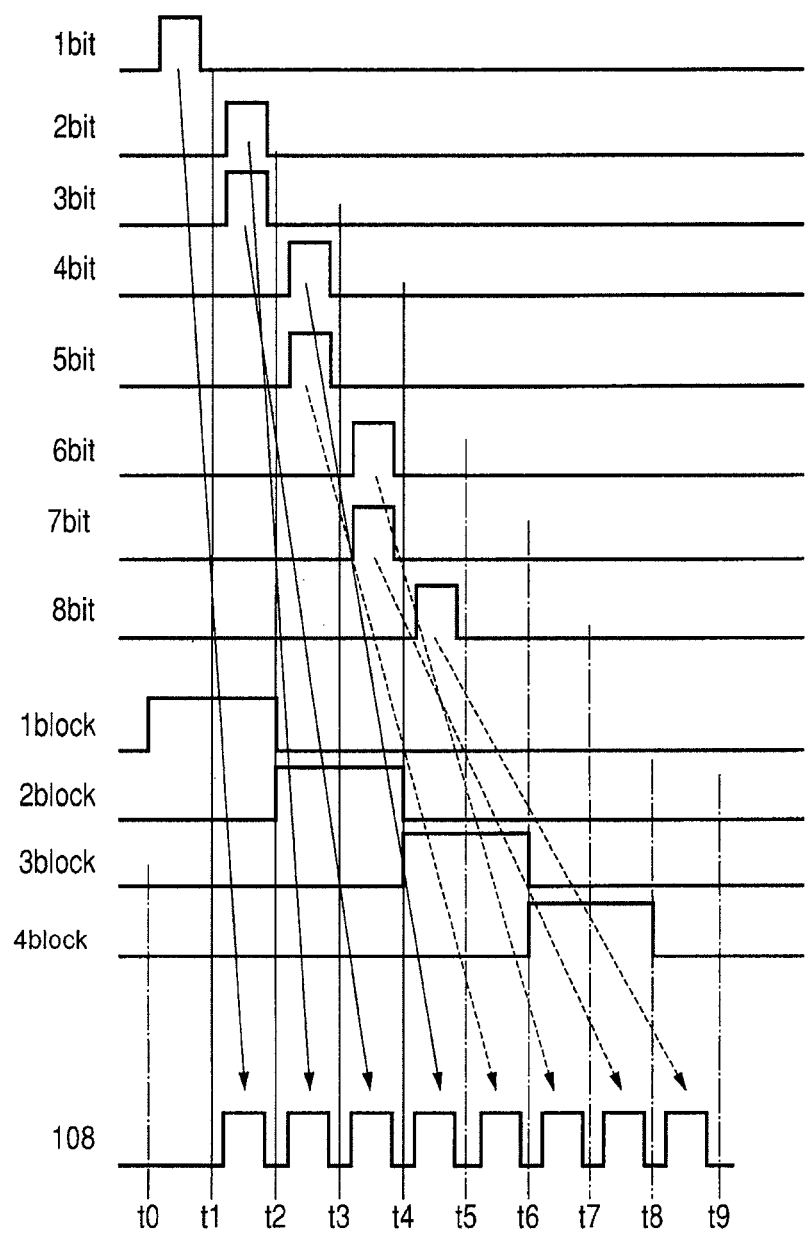
FIG. 8 is a timing chart illustrating the readout operation of the solid-state imaging apparatus according to the second embodiment of the present invention.

FIG. 7 is a block diagram illustrating a configuration example of a solid-state imaging apparatus according to a second embodiment of the present invention. In FIG. 7, since circuit units same as those in FIG. 1 are denoted by the same reference numerals, explanation of the circuit units is omitted. FIG. 8 is a timing chart illustrating readout timing in the second embodiment.

This embodiment is described in detail below with reference to the block diagram of FIG. 7 and the timing chart of FIG. 8. In this embodiment, two channels of common digital output lines 108 are present. Consequently, it is possible to simultaneously output digital signals from two columns, an even number column and an odd number column.

When the first bit is enabled, the horizontal scanning circuit 107 simultaneously performs read out from the digital memories 103 in the first column and the second column. In this embodiment, two channels of block digital output lines 104 and two channels of block selecting units 106 are also present. Parallel readout for two columns can be performed. Consequently, the horizontal scanning circuit 107 ends readout for sixteen columns in selecting operation for eight bits. This enables high-speed readout.

At time t0 to t1, a first bit of the horizontal scanning circuit 107 changes to a high level. According to this change, readout from the digital memories 103 in the first column and the second column are enabled. Similarly, when a second bit changes to the high level at time t1 to t2, readout from the digital memories 103 in the third column and the fourth column are enabled. The same holds true at time t2 to t3 and subsequent time.

A first block of the block selecting unit 106 is enabled at time t0 to t2 and a second block is enabled at time t2 to t4. Readout results of the digital memories 103 in the first column and the second column enabled at time t0 to t1 are output through the block selecting unit 106. Consequently, the readout results are output to the common digital output lines 108 at time t1 to t2 with a delay of one clock with respect to a clock supplied from the clock generator 110. For the second bit, in the same manner, readout results of the digital memories 103 in the third column and the fourth column are output to the common digital output lines 108 with a delay of one clock. Output denoted by reference numeral 108 in FIG. 8 indicates one of the two channels in FIG. 7. Concerning the other channel, readout results are output at the same timing.

Outputs for a third bit and a fourth bit are output to the common digital output lines 108 through switches of two block selecting circuits 106. As a result, outputs of the three bits selected at time t1 to t2 are output to the common digital output lines 108 at time t3 to t4 with a delay of two clocks with respect to the clock supplied from the clock generator 110.

Therefore, in this embodiment, the second bit and the third bit are simultaneously enabled (changed to the high level) by the horizontal scanning circuit 107 at time t1 to t2, which is a boundary between the blocks, with a clock delay between the blocks taken into account. The same operation is repeated for a fifth bit and subsequent bits. With this readout method, it is possible to output signals from the common digital output lines 108 in order in which the pixels are arrayed.

As described above, when signals are simultaneously read out in plural channels, it is also possible to read out digital signals to the common digital output lines 108 in order in which the pixels are arrayed and without a break.

In this embodiment, the two channels of the common digital output lines 108 are provided. However, when a further increase in speed is desired, three or more channels of common digital output lines may be provided.

In this embodiment, all the readout circuits (the circuits 102, 103, 104, 105, 106, 107, and 108) are arranged below the pixels to readout signals. However, the arrangement of the readout circuits is not limited to this. For example, the AD converters 102 and the digital memories 103 may be arranged above and below the pixels in such a manner that those for the first bit are arranged above the pixel region and those for the second bit are arranged below the pixel region. According to the arrangement, two sets each of the block digital output lines 104, the buffer circuits 105, the block selecting units 106, the common digital output lines 108, and horizontal scanning circuits 107 may be arranged above and below the pixel region to perform readout in two channels.

Third Embodiment

Figure 9:
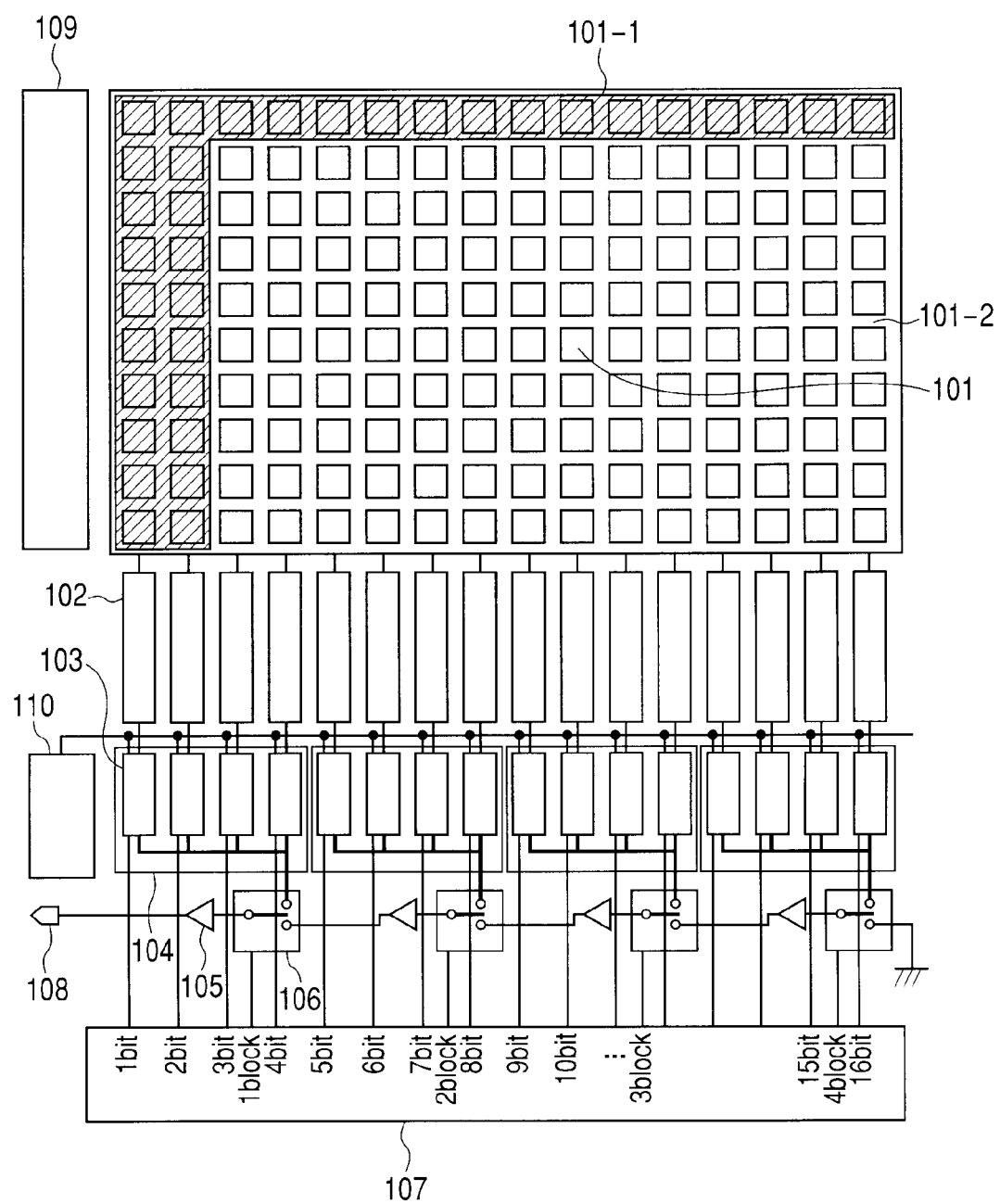
FIG. 9 is a block diagram illustrating a configuration example of a solid-state imaging apparatus according to a third embodiment of the present invention.

FIG. 9 is a block diagram illustrating a configuration example of a solid-state imaging apparatus according to a third embodiment of the present invention. In FIG. 9, since circuit units same as those in FIG. 1 are denoted by the same reference numerals, explanation of the circuits is omitted. In this embodiment, the block digital output lines 104 are connected to the buffer circuits 105 via the block selecting units 106. Concerning timing for readout in this embodiment, signals can be read out at timing same as that in FIG. 6 described in the first embodiment. Therefore, detailed explanation of the timing is omitted.

In this embodiment, by providing the sense amplifier circuit illustrated in FIG. 4 in the buffer circuit 105, a differential format can be adopted for a format of a sense amplifier in the same manner as adopting the differential format for the output of the digital memory 103. As a result, it is easy to perform readout using the sense amplifier illustrated in FIG. 4 not only in the block digital output line 104 but also in readout among blocks. In the case of the configuration including the sense amplifier, since it is unnecessary to change the transmission of signals among the blocks to the full high level and to the full low level, it is possible to read out signals at high speed and low power consumption as described in the first embodiment.

Fourth Embodiment

Figure 10:
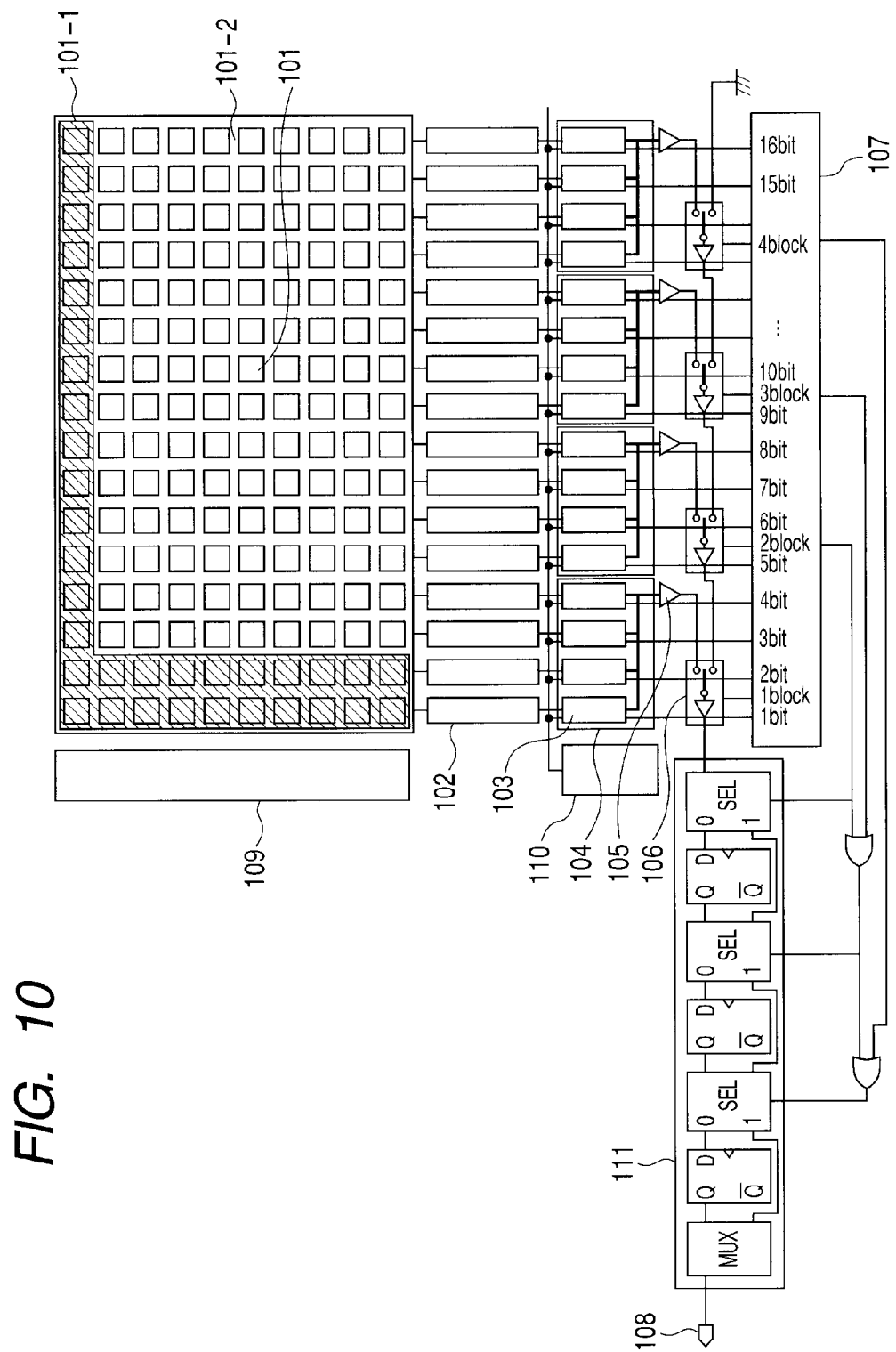
FIG. 10 is a block diagram illustrating a configuration example of a solid-state imaging apparatus according to a fourth embodiment of the present invention.
Figure 11:
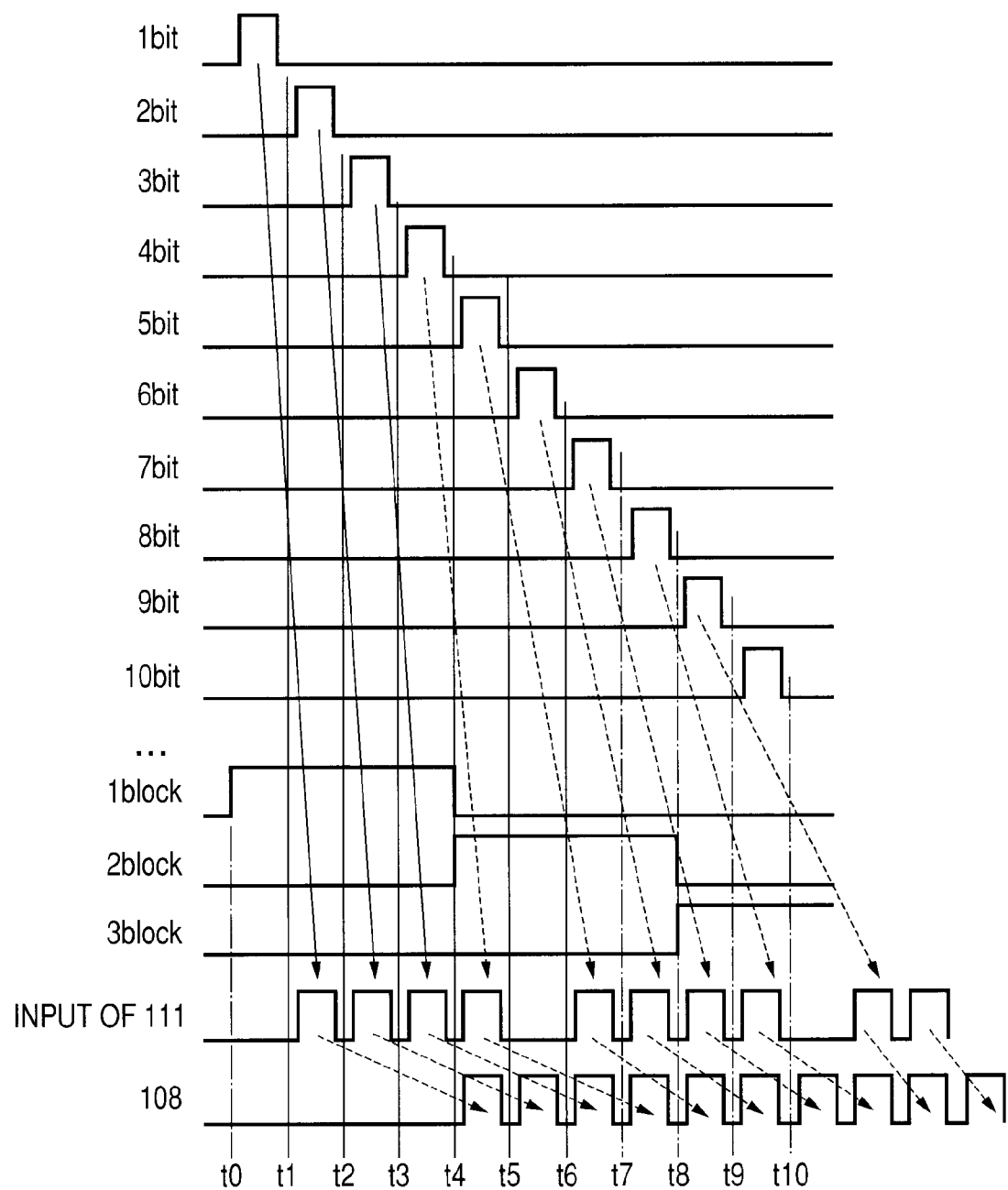
FIG. 11 is a timing chart illustrating the readout operation of the solid-state imaging apparatus according to the fourth embodiment of the present invention.
Figure 12:
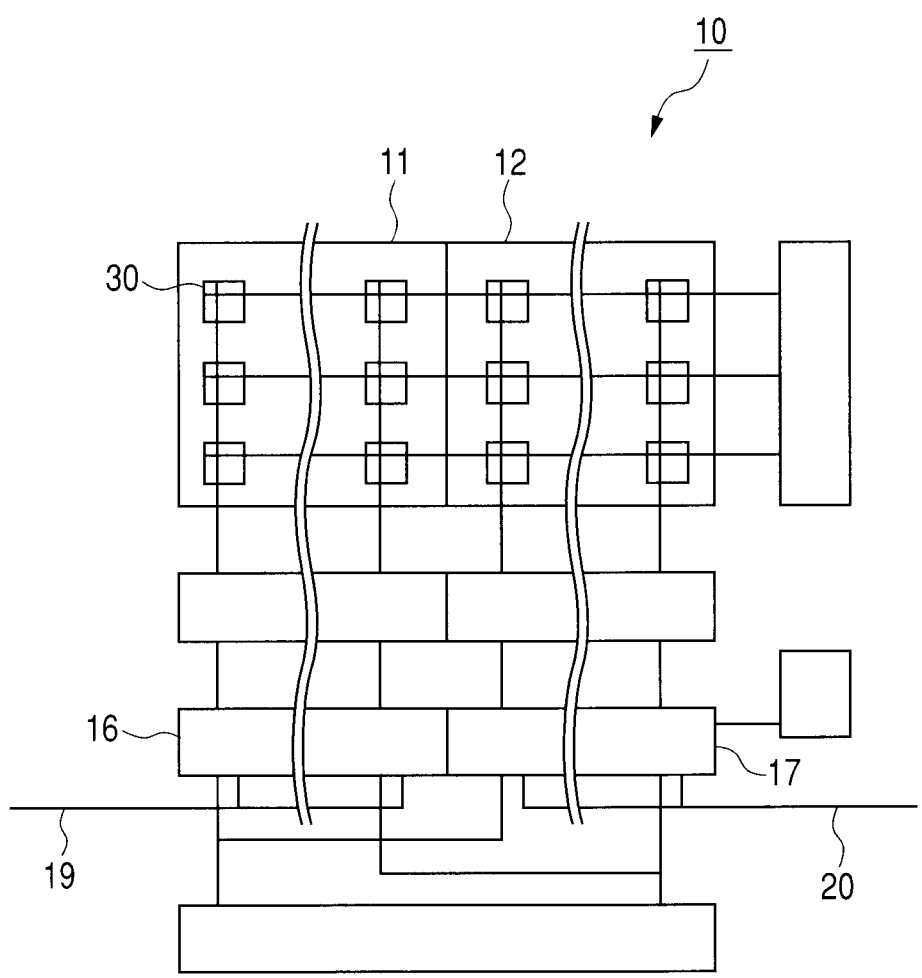
FIG. 12 is a diagram illustrating the circuit configuration of a solid-state imaging apparatus in the past.

FIG. 10 is a block diagram illustrating a configuration example of a solid-state imaging apparatus according to a fourth embodiment of the present invention. In FIG. 10, since circuit units same as those in FIG. 1 are denoted by the same reference numerals, explanation of the circuits is omitted. FIG. 11 is a timing chart illustrating readout timing in the fourth embodiment. In the first embodiment, the horizontal scanning circuit 107 simultaneously changes the two bits to the high level. However, the horizontal scanning circuit 107 in this embodiment changes one bit to the high level at one timing.

Reference numeral 111 denotes a selective delaying circuit, which is a logic circuit including a flip-flop circuit, a selecting circuit, and a multiplexer.

Operation is described below with reference to the timing chart of FIG. 11. At time t0 to t1, a first bit of the horizontal scanning circuit 107 changes to the high level. According to the change, readout from the digital memory 103 in the first column is enabled. Similarly, a second bit changes to the high level at time t1 to t2, whereby readout from the digital memory 103 in the second column is enabled. The same holds true at time t2 to t3 and subsequent time.

A first block of the block selecting unit 106 is enabled at time t0 to t4 and a second block is enabled at time t4 to t8.

A readout result of the digital memory 103 in the first column enabled at time t0 to t1 is output through the buffer circuit 105. Consequently, a signal reaches an input terminal of the selective delaying circuit 111 at time t1 to t2 with a delay of one clock with respect to a clock supplied from the clock generator 110. Similarly, signals of second to fourth bits are input to the input terminal of the selective delaying circuit 111 with a delay of one clock with respect to the clock supplied from the clock generator 110.

On the other hand, signals of fifth to eighth bits pass the buffer circuit 105 twice. Therefore, a delay of two clocks occurs until readout of the fifth to eighth bits reaches the input terminal of the selective delaying circuit 111. As a result, the signal of the fifth bit read out at time t4 to t5 reaches the input terminal of the selective delaying circuit 111 in a period of time t6 to t7.

Signals of a ninth bit and subsequent bits are further delayed by one clock. Signals of a thirteenth bit and subsequent bit are further delayed by one clock than the signal of the ninth bit. Therefore, a gap of data occurs at the input terminal of the selective delaying circuit 111 at time such as a period of time t5 to t6 and a period of time t10 to tn.

Therefore, the gap of the data is corrected by using the selective delaying circuit 111. The selective delaying circuit 111 adjusts a delay based on a block switching signal of the horizontal scanning circuit 107. Specifically, the selective delaying circuit 111 delays signals of the first to fourth bits by three clocks and delays signals of the fifth to eighth bits by two clocks. By changing the delay for each of the blocks in this way, it is possible to output data without a break to the common output terminal 108 in order in which the pixels are arrayed.

Fifth Embodiment

Figure 13:
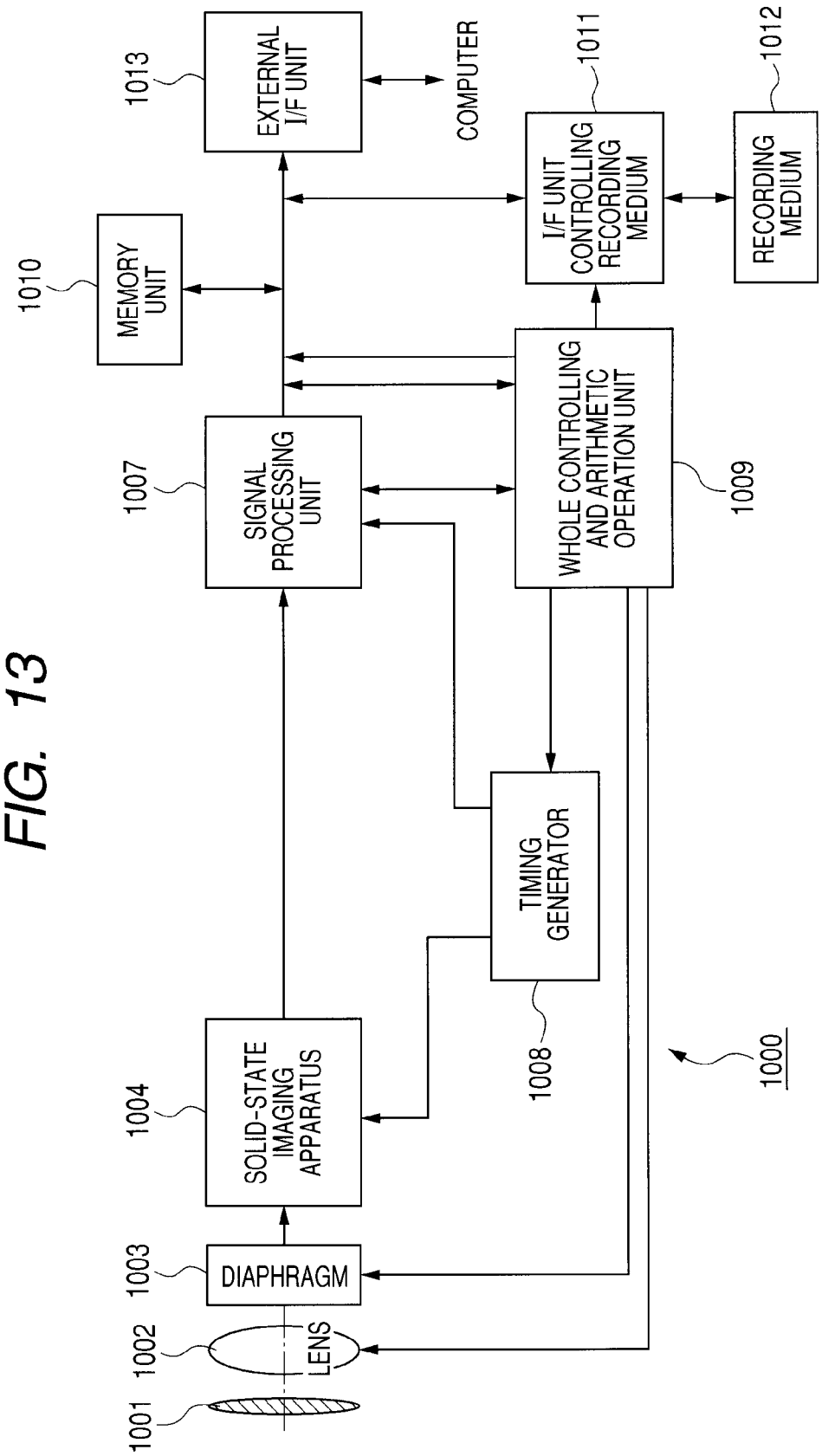
FIG. 13 is a diagram illustrating a configuration example of an imaging system according to a fifth embodiment of the present invention.

FIG. 13 is a diagram illustrating a configuration example of an imaging system 1000 according to a fifth embodiment of the present invention using the solid-state imaging apparatus according to the embodiments. A solid-state imaging apparatus 1004 has a configuration including the solid-state imaging apparatus described in the embodiments and including other imaging signal processing circuits. The other imaging signal processing circuits are circuits for performing, for example, correction of offset, linearity, and fixed pattern noise, rearrangement for passing data to an output signal processing unit, and frequency conversion. A part or all of the imaging signal processing circuits may be formed on the outside of the solid-state imaging apparatus 1004.

The solid-state imaging apparatus 1004 converts an optical image focused by a lens 1002 into image data. Reference numeral 1001 denotes a barrier functioning as both protection for the lens 1002 and a main switch. The lens 1002 is an optical system that focuses an optical image of a subject on the solid-state imaging apparatus 1004. An amount of light passing through the lens 1002 is changed by a diaphragm 1003. A signal processing unit 1007 applies various kinds of correction to the image data output from the solid-state imaging apparatus 1004 and compresses the data. A timing generator 1008 outputs various timing signals to the signal processing unit 1007.

The circuits 1007 and 1008 may be formed on a chip on which the solid-state imaging apparatus 1004 is formed. The imaging system 1000 includes a whole controlling and arithmetic operation unit 1009 that controls various arithmetic operations and the entire imaging system 1000, a memory unit 1010 for temporarily storing image data, and a interface unit controlling recording medium 1011 for performing recording in and readout from a recording medium. The imaging system 1000 further includes a recording medium 1012 to which a semiconductor memory or the like for performing recording and readout of image data is detachably attachable and an external interface (I/F) unit 1013 for communicating with an external computer and the like.

The operation of the imaging system 1000 illustrated in FIG. 13 is described below. When the barrier 1001 is opened, a main power supply is turned on, a power supply for control systems such as the whole controlling and arithmetic operation unit 1009 is then turned on, and a power supply for imaging system circuits such as the solid-state imaging apparatus 1004 is further turned on.

Subsequently, the imaging system 1000 performs operation for controlling an exposure amount. The whole controlling and arithmetic operation unit 1009 opens the diaphragm 1003. A signal output from the solid-state imaging apparatus 1004 at this point is input to the signal processing unit 1007. The signal processing unit 1007 causes the whole controlling and arithmetic operation unit 1009 to perform arithmetic operation for calculating exposure based on the signal. The signal processing unit 1007 determines the brightness of a subject according to a result of the arithmetic operation. The whole controlling and arithmetic operation unit 1009 controls the diaphragm 1003. This determination can be performed by, for example, comparing data stored in the whole controlling and arithmetic operation unit 1009 in advance.

The whole controlling and arithmetic operation unit 1009 performs, based on the signal output from the solid-state imaging apparatus 1004, arithmetic operation for extracting a high-frequency component and calculating a distance to the subject. Thereafter, the whole controlling and arithmetic operation unit 1009 drives the lens 1002 and determines whether the lens 1002 is focused in the driven state. When it is determined that the lens 1002 is not focused, the whole controlling and arithmetic operation unit 1009 drives the lens 1002 again and performs ranging. This determination can be performed by, for example, comparing the data stored in the whole controlling and arithmetic operation unit 1009 in advance.

Main exposure is started after it is determined that the lens 1002 is focused. When the exposure ends, an image signal output from the solid-state imaging apparatus 1004 is accumulated in the memory unit 1010 by the whole controlling and arithmetic operation unit 1009 after being processed by the signal processing unit 1007. Thereafter, data accumulated in the memory unit 1010 is recorded in the detachable recording medium 1012 such as a semiconductor memory via the recording medium control I/F unit 1011 according to the control by the whole controlling and arithmetic operation unit 1009. The data may be directly input to a computer or the like via the external I/F unit 1013.

According to the first to fifth embodiments, it is possible to output digital signals at high speed and output the digital signals in order in which the pixels are arrayed.

Each of the solid-state imaging apparatuses according to the first to fourth embodiments includes the pixel region 101 in which pixels that output analog signals are arranged in a matrix shape. The plural analog-to-digital converters 102 are provided to correspond to the columns of the pixel region 101 and convert analog signals obtained by photoelectric conversion of the plural pixels into digital signals. The plural digital memories 103 store the digital signals converted by the analog-to-digital converters 102. With the plural digital memories 103 set as blocks, the plural block digital output lines 104 are provided to correspond to the blocks and output the digital signals stored in the plural digital memories 103 included in the blocks. The common digital output line 108 outputs the digital signals from the plural block digital output lines 104. The buffer circuits 105 are provided between the block digital output lines 104 and the common digital output line 108 and buffer the digital signals output from the block digital output lines 104. The block selecting units 106 are provided between the block digital output lines 104 and the common digital output line 108 and can switch the block digital output lines 104 electrically connected to the common digital output line 108.

The horizontal scanning circuit 107 controls readout order for the digital memories 103. In controlling the order, as illustrated in FIG. 11, the horizontal scanning circuit 107 performs control such that the digital signals stored in the digital memories 103 are output to the common digital output line 108 in order in which the digital memories 103 are arrayed (the first bit to the tenth bit).

The buffer circuit 105 illustrated in FIG. 2 includes the CMOS inverter. The buffer circuit 105 illustrated in FIG. 3 includes the synchronizing delaying circuit that synchronizes an input signal to a clock. The buffer circuit 105 illustrated in FIG. 4 includes the comparing circuit that compares input differential signals and decides logic.

In FIG. 10, the selective delaying circuit 111 is provided between the common digital output line 108 and the block digital output line 104 and performs control of a delay for each of the blocks.

In FIG. 7, the plural block digital output lines 104 are provided for each of the blocks. The digital signals stored in the plural digital memories 103 included in one block are output in parallel.

The horizontal scanning circuit 107 performs control such that the digital signals stored in the adjacent digital memories 103 included in the adjacent blocks are output to the corresponding block digital output lines 104 at the same timing.

In FIG. 6, the horizontal scanning circuit 107 controls readout timing for the digital memories 103 such that the output of the digital signals are not interrupted even in breaks of the blocks.

As illustrated in FIG. 13, the imaging system 1000 according to the fifth embodiment includes the solid-state imaging apparatus 1004 according to any one of the first to fourth embodiments, the optical system (lens) 1002 that forms an optical image in the pixel region 101, and the signal processing unit 1007 that processes a signal output from the solid-state imaging apparatus 1004.

As described above, according to the first to fifth embodiments, it is possible to divide the output lines of the digital memories 103 into plural blocks and read out output signals in order in which the pixels are arrayed. Consequently, it is possible to read out the digital signals temporarily stored in the digital memories 103 at high speed.

All the embodiments simply indicate examples of materialization in carrying out the present invention. The technical scope of the present invention should not be limitedly interpreted by the embodiments. In other words, the present invention can be carried out in various forms without departing from the technical idea or main characteristics thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-321292, filed Dec. 17, 2008, which is hereby incorporated by reference herein in its entirety.

What is claimed is:

1. A solid-state imaging apparatus comprising:
   a pixel region including a plurality of pixels arranged in columns, and each pixel performs photoelectric conversion and outputs an analog signal;
   a plurality of analog-to-digital converters respectively corresponding to the columns of pixels, and each analog-to-digital converter converts an analog signal output by a pixel of a corresponding column into a digital signal;

a plurality of digital memories respectively corresponding to the columns of pixels, and each digital memory holds the digital signal converted by the analog-to-digital converter of the corresponding column;

first and second block wirings respectively corresponding to mutually different blocks of the plurality of digital memories;

a first buffer for buffering an output from the first block wiring; and a second buffer for selectively buffering the output from the first buffer or an output from the second block wiring, an output of the second buffer being coupled to a common digital output line.

2. The solid-state imaging apparatus according to claim 1, further comprising:

a first block buffer circuit for buffering a signal outputted to the first block wiring, to supply the buffered signal to the first buffer, and a second block buffer circuit for buffering a signal outputted to the second block wiring, to supply the buffered signal to the second buffer.

3. The solid-state imaging apparatus according to claim 2, wherein each of the first and second block buffer circuits includes an inverter circuit.

4. The solid-state imaging apparatus according to claim 2, wherein each of the first and second block buffer circuits includes a synchronizing circuit for synchronizing a signal inputted with a clock.

5. An imaging system comprising:

the solid-state imaging apparatus according to claim 1;

an optical series for forming an optical image onto the pixel region; and a signal processing unit for processing a signal outputted from the solid-state imaging apparatus.

* * * * *